UNITED STATES PATENT OFFICE.

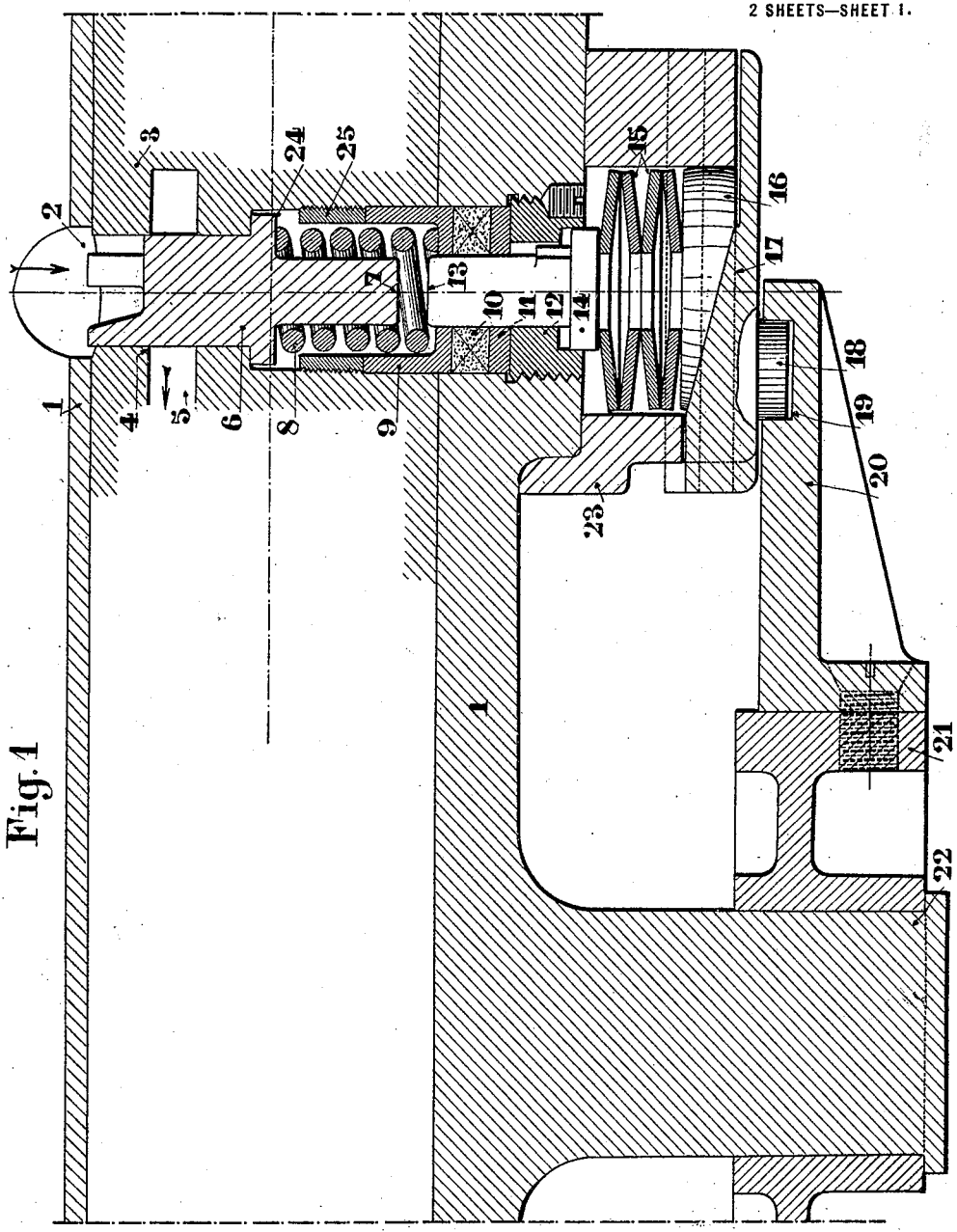

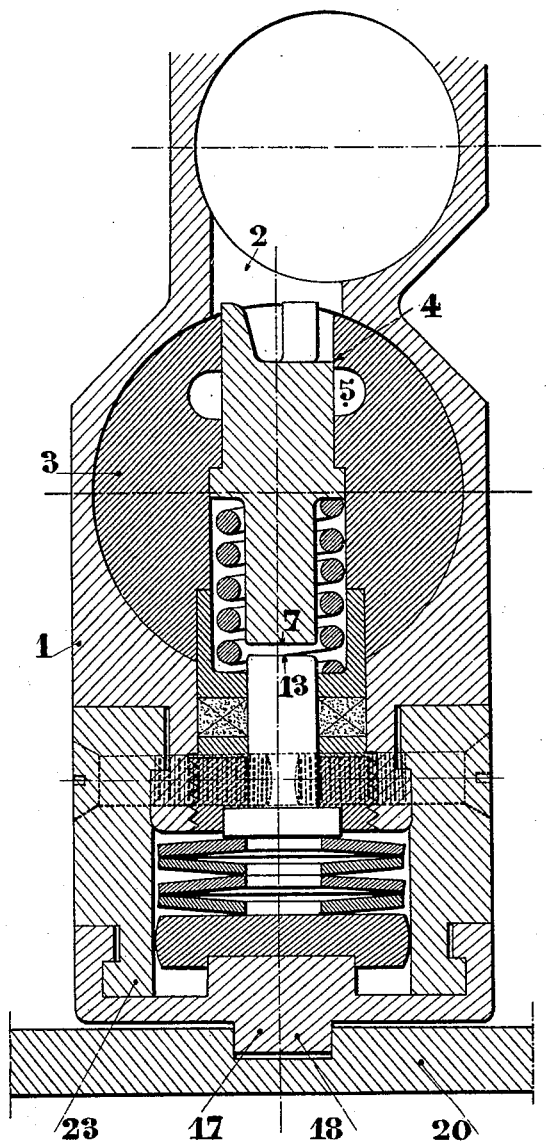

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

REGULATING DEVICE FOR THE FLOW OF LIQUID IN ORDNANCE-BUFFERS.

1,318,923.      Specification of Letters Patent.     Patented Oct. 14, 1919.

Application filed May 3, 1918. Serial No. 232,385.

*To all whom it may concern:*

Be it known that I, EMILE RIMAILHO, a citizen of the French Republic, and residing in Paris, France, 98 Rue de la Victoire, consulting engineer, have invented certain new and useful Improvements in and Relating to Regulating Devices for the Flow of Liquid in Ordnance-Buffers, of which the following is a complete specification.

A regulating device for the flow of liquid in ordnance-buffers is known, in which device the lift of a valve is rendered automatically variable as a function of the angles of firing by means of a set of inclines controlled by a suitably outlined cam. This device fulfils generally the requirements of firing artillery-appliances. When, however, the conditions of firing require a very large variation of the possible length of recoil, this method of regulating the flow of the liquid becomes insufficient, because the undue reduction of the valve-lift generates exaggerated pressures liable to jeopardize both the stability and the resistance of the ordnance. It is then preferable to use the device constituting the object of this invention, which enables all the necessary variations of recoil to be obtained by substituting for the action of the single valve-spring of the known device the simultaneous action of a second spring or elastic means, element or device, which produces in the buffer two different rates of working: the one, with a low pressure, for the angles of firing for which the long recoil is possible; the other, with a high pressure, for the angles of firing for which the short recoil is indispensable.

In the accompanying drawing, which illustrates, by way of example, a constructional form of the invention together with an alternative form thereof:

Figure 1 is a horizontal section through the device;

Fig. 2 is a modified form of the same, in which the elements are shown in sectional elevation.

In Fig. 1, 1 is the buffer-body or casing in which is bored the inlet-orifice 2 of the liquid into the body 3 of the regulating device. The body 3 is held in the casing 1. 4 is the orifice for the flow of liquid to be regulated, 5 is the outlet-orifice from the regulating device, 6 the recoil-valve, of which 7 and 24 are the faces or abutments, and 8 is the first valve-spring bearing against the socket 9, upon which presses the packing 10 tightened by the washer 11 and nut 12. In the axis of the parts 9, 10, 11, 12 is located slidably the abutment rod 13 having a shoulder 14, against which rests a second spring, the power of which is chosen in accordance with the momentum to be deadened during the recoil, and constituted, in the present instance, by two pairs of Belleville washers 15. These washers rest, on the other end, upon an adjusting wedge 16 operated by a controlling wedge 17, a cylindrical projection 18 of which is engaged into the suitably outlined groove 19 of the cam 20 secured, either on the mounting 21, or on an element independent from the swinging part of the ordnance around the trunnions 22.

The second spring 15 is placed outside of the buffer as well as the inclines 16 and 17, the whole being guided by a socket 23 (fastened to the buffer-body 1), the extreme edge of which is outlined for the sliding movement of the controlling wedge 17. An annular shoulder 25 is screw-threaded within the body 3, and is arranged near the socket 9. The shoulder 25 is normally spaced from the shoulder 24, but the shoulder 24 contacts therewith when the valve 6 is forced downwardly sufficiently.

Fig. 2 illustrates, at rest, a device similar to the foregoing one, but in which the second spring 15 is under initial tension and which has not the shoulder 25 of Fig. 1. With this device, in all the conditions of firing, the valve-lift is always limited by the abutment-rod 13 resting against the second spring 15. It is obvious that the two springs 8 and 15 are employed, and that the distance between the stems 7 and 13 may be regulated by adjusting the cams or wedges 16 and 17. In this form of device the stems 7 and 13 engage during the greater portion of the downward movement of the valve, which is thereby opposed by the combined action of the springs 8 and 15.

What I claim is:

1. In apparatus of the character described, a body provided with a bore, having an inlet and outlet, a valve mounted to slide within the bore to control the discharge of fluid pressure from the outlet, a spring arranged within the bore to engage with the valve to oppose its opening movement, a yielding device having a substantially greater stiffness than said spring and arranged near the same, a stem carried by the valve, and a second stem engaged by the yielding device and disposed in the path of travel of the first named stem and normally spaced therefrom and adapted to be engaged thereby when the valve is shifted beyond a predetermined limit in one direction.

2. In apparatus of the character described, a body provided with a bore, having an inlet and outlet, a valve mounted to slide within the bore to control the discharge of fluid pressure from the outlet, a spring arranged within the bore to engage with the valve to oppose its opening movement, a yielding device having a substantially greater stiffness than said spring and arranged near the same, a stem carried by the valve, a second stem engaging the yielding device and disposed in the path of travel of the first named stem and normally spaced therefrom and adapted to be engaged thereby, and adjustable means to regulate the tension of the yielding device.

3. In apparatus of the character described, a body provided with a bore having an inlet and outlet, a valve mounted to slide within the bore to control the discharge of fluid pressure from the outlet, a spring arranged within the bore to engage with the valve to oppose its opening movement, a yielding device having a substantially greater stiffness than said spring and arranged near the same, a stem carried by the valve, a second stem engaging the yielding device and disposed in the path of travel of the first named stem in spaced relation thereto, a disk to regulate the tension of the yielding device and having an inclined face, and a member to move the disk and having an inclined face to engage with the first named inclined face.

In testimony whereof I have hereunto set my hand at Saint Etienne (France).

EMILE RIMAILHO. [L. S.]

Copies of this patent may be obtained for five cents each, by addressing the "Commissioner of Patents, Washington, D. C."